United States Patent
Kaul et al.

(10) Patent No.: US 6,323,864 B1
(45) Date of Patent: *Nov. 27, 2001

(54) USING AND ACCESSING INFORMATION FROM FONTS IN MULTIPLE FORMATS

(75) Inventors: Jeet Kaul, Cupertino; James Graham, Sunnyvale, both of CA (US)

(73) Assignee: Sun Microsystems, Inc., Palo Alto, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/885,615

(22) Filed: Jun. 30, 1997

(51) Int. Cl.$^7$ ................. G06T 11/00; G06F 7/00
(52) U.S. Cl. ........................... 345/467; 707/100
(58) Field of Search ................... 345/144, 192, 345/357, 467–469, 471, 472; 358/1.11; 707/100, 102, 103 R, 103, 103 Y, 103 Z, 104.1, 517–524

(56) References Cited

U.S. PATENT DOCUMENTS

| | | |
|---|---|---|
| 5,291,585 | 3/1994 | Sato et al. . |
| 5,335,320 | 8/1994 | Iwata et al. . |
| 5,345,550 | 9/1994 | Bloomfield . |
| 5,347,627 | 9/1994 | Hoffmann et al. . |
| 5,384,911 | 1/1995 | Bloomfield . |
| 5,412,772 | 5/1995 | Monson . |
| 5,414,806 | 5/1995 | Richards . |

(List continued on next page.)

OTHER PUBLICATIONS

Ronald L. Johnston, "The Dynamic Incremental Compiler of APL/3000" Proceedings of the APL'79 Conference, published as APL Quote Quad, 9(4), p 82–87.

Leo J. Guibas et al., "Compilation and Delayed Evaluation in APL," Fifth Annual Synposium on Principles in Programming Languages, p 2, 1978 p 2, 4.

Gleen Krasner "The Smalltalk–80 Virtual Machine" BYTE Publications Inc., Aug. 1991, pp 300–320.

*Primary Examiner*—William A. Cuchlinski, Jr.
*Assistant Examiner*—Thu Nguyen
(74) *Attorney, Agent, or Firm*—The Hecker Law Group (57) ABSTRACT

One embodiment of the invention provide for access and use of information from fonts in multiple formats (including font format specific information) in an object oriented system. A generic private Font Handler abstract class is defined with multiple methods and references to objects and variables to provide for the storage and retrieval of information. Subclasses of the Font Handler class implement the abstract methods and provide for retrieval of this information. Further, each Font Handler subclass and instances thereof implement a specific interface that provides format specific capabilities. Font information is stored in instances of the Font Handler. A Font class is defined that provides application developers the ability to access the information from the Font Handler. When an application developer desires to use a particular font, the developer creates an instance of the Font class and establishes an association with a corresponding Font Handler instance. Frequently used information may be cached into variables or objects of the Font class. Information that is not cached is retrieved by calling the appropriate Font Handler method through its association. In this manner, one object may be used to access and use fonts of varying formats. An application developer may retrieve general information and format specific information from one object, a Font class object, without any knowledge of the underlying Font Handler. In another embodiment, the Font Handler class is not utilized and the Font class incorporates the methods and references of the Font Handler class thus providing direct access to font information.

53 Claims, 6 Drawing Sheets

U.S. PATENT DOCUMENTS

| | | |
|---|---|---|
| 5,423,034 | 6/1995 | Cohen-Levy et al. . |
| 5,430,836 | 7/1995 | Wolf et al. . |
| 5,436,637 | 7/1995 | Gayraud et al. . |
| 5,448,695 | 9/1995 | Douglas et al. . |
| 5,461,399 | 10/1995 | Cragun . |
| 5,461,710 | 10/1995 | Bloomfield et al. . |
| 5,473,745 | 12/1995 | Berry et al. . |
| 5,491,784 | 2/1996 | Douglas et al. . |
| 5,493,638 | 2/1996 | Hooper et al. . |
| 5,509,116 | 4/1996 | Hiraga et al. . |
| 5,526,517 | 6/1996 | Jones et al. . |
| 5,544,288 | 8/1996 | Morgan et al. . |
| 5,546,519 | 8/1996 | Berry . |
| 5,548,702 | 8/1996 | Li et al. . |
| 5,550,968 | 8/1996 | Miller et al. . |
| 5,559,942 | 9/1996 | Gough et al. . |
| 5,564,003 | 10/1996 | Bell et al. . |
| 5,566,330 | 10/1996 | Sheffield . |
| 5,570,462 | 10/1996 | McFarland . |
| 5,572,643 | 11/1996 | Judson . |
| 5,586,241 * | 12/1996 | Bauermeister et al. .............. 345/467 |
| 5,630,042 * | 5/1997 | McIntosh et al. .................... 345/340 |
| 5,694,603 | 12/1997 | Reiffin . |
| 5,694,604 | 12/1997 | Reiffin . |
| 5,781,714 * | 7/1998 | Collins et al. ........................ 345/471 |
| 5,870,084 * | 2/1999 | Kanungo et al. ..................... 345/192 |

* cited by examiner

USING AND ACCESSING INFORMATION FROM FONTS IN MULTIPLE FORMATS

BACKGROUND OF THE INVENTION

1. Field of The Invention

This invention relates to the field of font formats.

2. Background Art

When words or text are printed or displayed on a computer display, it is desirable for the application to be capable of accessing and utilizing all fonts stored within the computer system regardless of their format. The developer may want to use a particular font or perform a font specific feature that requires access to formatting details of the font. The current methods of accessing multiple font formats are architecture or platform dependent and do not provide enough flexibility for programmers that desire to fully utilize font specific features. A background of fonts and object oriented systems, along with a description of the disadvantages of prior art font accessibility, is described below.

Fonts

When words or text are displayed on a computer display or printed, it is often desirable to display or print the textual characters with varying designs, styles, and characteristics. For example, textual characters may have a design or format that the user feels is visually appealing. The particular design may be unique or consistent through a set of characters. In addition, the characters may have a specified obliqueness (degree of slant) and stroke weight (thickness of line). A set of characters that has a specific obliqueness, stroke weight, and a named design is referred to as a typeface (e.g., Courier, Helvetica, or Times). Multiple typefaces with a related or similar pattern or design are referred to as a family of typefaces (e.g., Courier, Courier Bold, Courier Oblique, and Courier Bold Oblique are in the same family of typefaces, Courier).

A typeface of a specific size (e.g., 10-point Courier) is referred to as a font. So while a typeface defines the design of the characters, the font defines the set of all characters in the typeface with a specific size and weight.

Another way to define a font is in terms of characters and glyphs. A character is a symbol that represents items like letters and numbers in a given writing system, for example, lowercase "g". When a given character is drawn, a shape now represents this character. This shape is called a glyph.

Each glyph must be mapped to a particular character for further use. Character encoding consists of a conversion table that maps the characters to glyph codes. A font is a collection of mapped glyphs and may have many faces, e.g., heavy, medium, oblique, gothic, and regular. In addition, all of these faces have a similar typographic design.

Outline Fonts and Bitmap Fonts

The physical appearance of a font (the glyph or typeface) is commonly created from two (2) methods. A font may be created from a mathematical formula that produces an outline for the characters, referred to as an outline font, or it may be created from a particular arrangement or pattern of dots, referred to as a bitmap font. The mathematical formulas of an outline font produce a series of lines and curves that are used to define the shape of each character to be printed. Because the characters are defined mathematically, they may be scaled to different sizes easily. However, when a character is scaled, the scaled outline may not properly align with the pixels on the display device. Consequently, the definitions of the outline font often adjust the outline or the illuminated pixels to generate a more visually appealing character. Unlike outline fonts, to obtain a larger or smaller size of a particular bitmap font, the bitmap font must be defined separately. Consequently, outline fonts are used more frequently than bitmap fonts.

Outline fonts may be defined in a multiplicity of different formats. Two common outline font formats are TrueType (developed by Apple and enhanced by Microsoft and Apple) and PostScript Type 1 (PostScript) (developed by Adobe Systems). A common objective in font use is for the text to appear on the display screen as close as possible to the text as it is printed; referred to as WYSIWYG (What You See Is What You Get) technology. To provide accurate WYSIWYG technology, a TrueType font definition contains different pixel adjustment (to match the outline to the pixels) than other font formats. In addition, each TrueType font (e.g., Helvetica Bold or Courier Bold Italic) is stored in a separate file in memory. The operating system then uses the stored files to generate, display, and print the font when necessary. To add an additional TrueType font, the developer or user merely needs to add the font file to the appropriate storage location.

A PostScript font is defined by a PostScript page-description language (PDL) that controls page layout and loads and scales outline fonts. The PDL is a logical programming language that provides for fonts and type sizes but leaves the printing and displaying of the font to the output device (i.e., printer or monitor). The PDL provides for scaling and accurate WYSIWYG output.

Due to the flexibility in both TrueType and PostScript font technology, these two font formats are commonly used. However, because they are formatted differently, a developer may not be able to use both formats simultaneously and efficiently without extensive problems and programming.

A developer may desire to display and use multiple fonts and font formats. Existing technology does not provide a platform independent effective manner for utilizing multiple font formats. One system used to access multiple font formats was produced by Apple Computer. The system consists of a Component Manager architecture and various font engines or components. When the developer desires to render a font, the application programming interface (API) accesses the component that performs the rendering.

Another prior art method is implemented in an object oriented system and utilizes Java™ (Java and all Java-based trademarks and logos are trademarks or registered trademarks of Sun Microsystems, Inc., in the United States and other countries), a computer programming language that is robust and may be utilized across multiple platforms. To fully understand the invention, it is useful to briefly discuss the Java™ programming language and object oriented systems.

Object Oriented System

Java™ is an object-oriented programming language. Object-oriented programming is a method of creating computer programs by combining certain fundamental building blocks, and creating relationships among and between the building blocks. The building blocks in object-oriented programming systems are called "objects." An object is a programming unit that groups together a data structure (instance variables) and the operations (methods) that can use or affect that data. Thus, an object consists of data and one or more operations or procedures that can be performed on that data. The joining of data and operations into a unitary building block is called "encapsulation".

An object can be instructed to perform one of its methods when it receives a "message." A message is a command or instruction to the object to execute a certain method. It consists of a method selection (name) and a plurality of arguments that are sent to an object. A message tells the receiving object what operations to perform.

One advantage of object-oriented programming is the way in which methods are invoked. When a message is sent to an object, it is not necessary for the message to instruct the object how to perform a certain method. It is only necessary to request that the object execute the method. This greatly simplifies program development.

Object-oriented programming languages are predominantly based on a "class" scheme. The class-based object-oriented programming scheme is generally described in Lieberman, "Using Prototypical Objects to Implement Shared Behavior in Object-Oriented Systems," OOPSLA 86 Proceedings, September 1986, pp. 214–223.

A class defines a type of object that typically includes both instance variables and methods for the class. An object class is used to create a particular instance of an object. An instance of an object class includes the variables and methods defined for the class. Multiple instances of the same class can be created from an object class. Each instance that is created from the object class is said to be of the same type or class.

A hierarchy of classes can be defined such that an object class definition has one or more subclasses. A subclass inherits its parent's (and grandparent's etc.) definition. Each subclass in the hierarchy may add to or modify the behavior specified by its parent class (also referred to as its superclass).

To illustrate, an employee object class can include "name" and "salary" instance variables and a "set_salary" method. Instances of the employee object class can be created, or instantiated for each employee in an organization. Each object instance is said to be of type "employee." Each employee object instance includes the "name" and "salary" instance variables and the "set_salary" method. The values associated with the "name" and "salary" variables in each employee object instance contain the name and salary of an employee in the organization. A message can be sent to an employee's employee object instance to invoke the "set_salary" method to modify the employee's salary (i.e., the value associated with the "salary" variable in the employee's employee object).

A developer may desire to have different implementations of a common method in each subclass. For example, suppose that a class A defines a method for printing the style of a font and that a class B defines a method for printing the point size of a font. Instead of providing for the same method in each class (with the only difference being the information that is printed), the Javau programming language permits the developer to define an interface implemented by both class A and class B that prints information. A class definition of the interface accepts instances of class A or class B as arguments to produce the desired result. Consequently, each class declares to implement the interface and creates their own implementation of the method. At run time, reference to the commonly implemented method is resolved. An interface also provides the functions the developer must define in order for future developers and users to communicate with specific instances of an object.

An object is a generic term that is used in the object-oriented programming environment to refer to a module that contains related code and variables. A software program can be written using an object-oriented programming language whereby the program's functionality is implemented using objects.

The technology developed by Sun Microsystems provides for a platform independent method of using multiple font formats. The system provides a getFontList() method that provides the developer with a short list of logical font names that are mapped onto specific fonts available on specific platforms. In addition, the Font class provides for a setFont (Font font) method and a getFont() method. The setFont (Font font) method allows the developer to specify the current font and takes a font object as an argument (the font object argument is often constructed within the argument brackets; i.e., a "Font" function creates, initializes and returns a new font object with user specified parameters). The getFont() method returns the current font. This prior art Font class does not permit detailed retrieval of font specific information from one object. In addition, only the logical font names are retrieved by the getFontList() method. A logical font name is the name that is public and available for a developer's view and use. Each logical font name is mapped internally onto a specific font available on a specific platform. Further, font format specific information is not available and may not be stored in the object.

The lack of flexibility, inability to access multiple font specific features, and the inability to access font format specific features from one object in the prior art necessitates the need for the present invention.

SUMMARY OF THE INVENTION

One or more embodiments of the invention provide for access and use of information from fonts in multiple formats (including font format specific information) in an object oriented system. In one or more embodiments of the invention, the font developer stores the created fonts in the host computer system. Each of the fonts is then parsed. A generic private Font Handler abstract class is defined with multiple methods and references to objects and variables to provide for the storage and retrieval of information. Subclasses of the Font Handler class specifically implement the abstract methods and provide for the retrieval of this information. In addition, each Font Handler subclass and instances thereof implement a specific interface that provides format specific capabilities. As a result, although the Font Handler class is generic across all formats, each subclass and instance are created in a specific format. The parsed information is loaded into an instance of a Font Handler object.

A Font class provides application developers the ability to access the information from the Font Handler. This ability is accomplished by establishing an association between an instance of the Font class with a corresponding Font Handler instance. When an application developer desires to use a particular font, the developer creates an instance of the Font class by calling its constructor. The constructor searches through the Font Handler instances for the desired font and once found, it adds a reference to the Font Handler instance in the Font class instance. In addition, frequently used information may be cached into variables or objects of the Font class. Information that is not cached is retrieved by calling the appropriate Font Handler method through its association. In this manner, one object may be used to access and use fonts of varying formats. In addition, an application developer may retrieve general information and format specific information from one object, a Font class object, without any knowledge of the underlying Font Handler.

In one or more embodiments, the Font class incorporates all of the methods and references of the Font Handler class and the Font Handler class is removed and not utilized. In this manner, one publicly accessible Font class maintains access to font information.

BRIEF DESCRIPTION OF THE DRAWINGS

FIG. 1 is a computer system that one or more embodiments of the invention may be implemented on.

DETAILED DESCRIPTION OF THE INVENTION

A system of accessing and using an object to obtain format specific information across fonts in multiple formats is described. In the following description, numerous, specific details, such as the use of specific names for classes, are set forth in order to provide a more thorough understanding of the present invention. It will be apparent, however, to one skilled in the art, that the present invention may be practiced without these specific details. In other instances, well known features have not been described in detail so as not to unnecessarily obscure the present invention.

Embodiment of Computer Execution Environment (Hardware)

Figure 1:
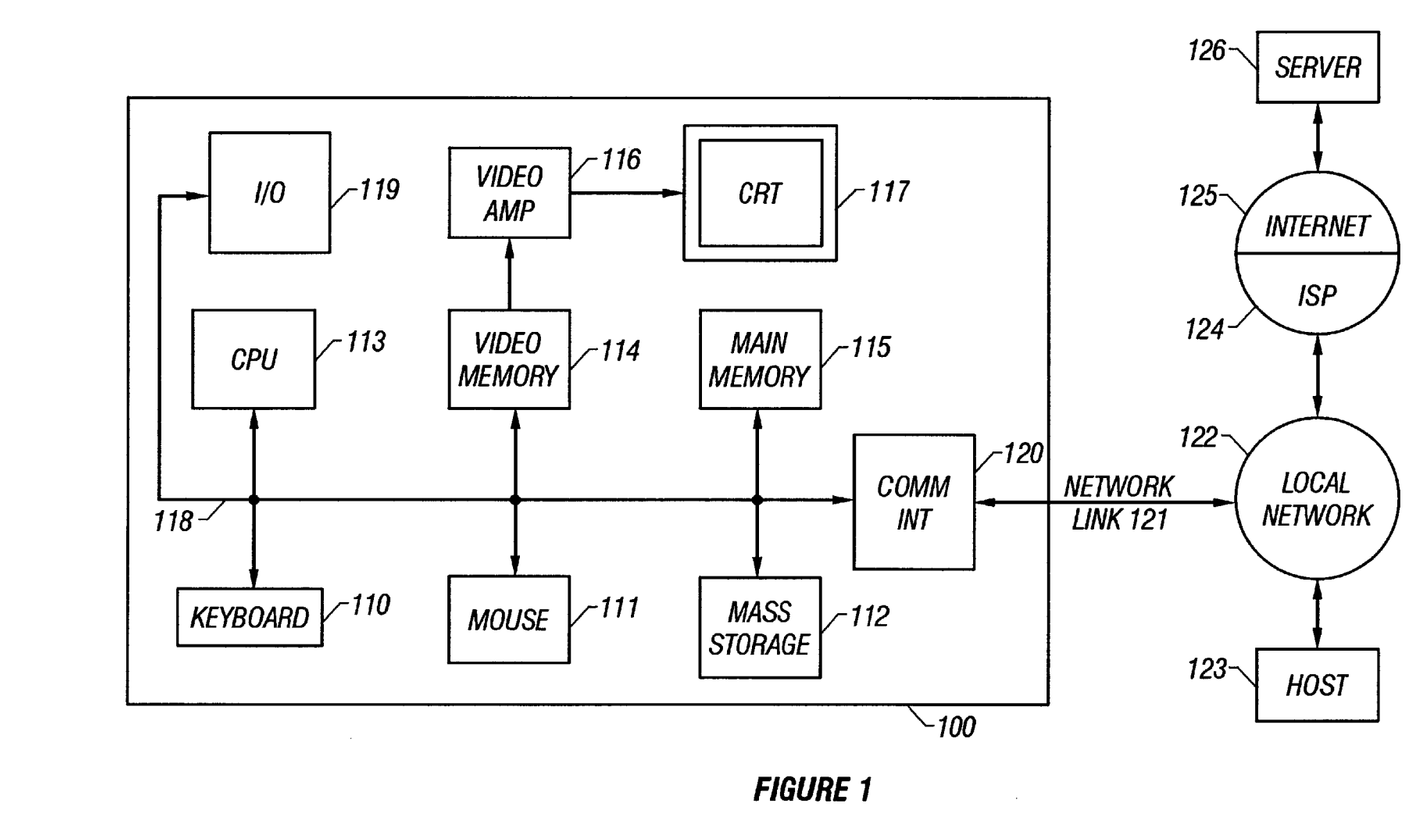

An embodiment of the invention can be implemented as computer software in the form of computer readable program code executed on a general purpose computer such as computer 100 illustrated in FIG. 1. A keyboard 110 and mouse 111 are coupled to a bi-directional system bus 118. The keyboard and mouse are for introducing user input to the computer system and communicating that user input to central processing unit (CPU) 113. Other suitable input devices may be used in addition to, or in place of, the mouse 111 and keyboard 110. I/O (input/output) unit 119 coupled to bi-directional system bus 118 represents such I/O elements as a printer, A/V (audio/video) I/O, etc.

Computer 100 includes a video memory 114, main memory 115 and mass storage 112, all coupled to bi-directional system bus 118 along with keyboard 110, mouse 111 and CPU 113. The mass storage 112 may include both fixed and removable media, such as magnetic, optical or magnetic optical storage systems or any other available mass storage technology. Bus 118 may contain, for example, thirty-two address lines for addressing video memory 114 or main memory 115. The system bus 118 also includes, for example, a 32-bit data bus for transferring data between and among the components, such as CPU 113, main memory 115, video memory 114 and mass storage 112. Alternatively, multiplex data/address lines may be used instead of separate data and address lines.

In one embodiment of the invention, the CPU 113 is a microprocessor manufactured by Motorola, such as the 680X0 processor or a microprocessor manufactured by Intel, such as the 80X86, or Pentium processor, or a SPARC microprocessor from Sun Microsystems. However, any other suitable microprocessor or microcomputer may be utilized. Main memory 115 is comprised of dynamic random access memory (DRAM). Video memory 114 is a dual-ported video random access memory. One port of the video memory 114 is coupled to video amplifier 116. The video amplifier 116 is used to drive the cathode ray tube (CRT) raster monitor 117. Video amplifier 116 is well known in the art and may be implemented by any suitable apparatus. This circuitry converts pixel data stored in video memory 114 to a raster signal suitable for use by monitor 117. Monitor 117 is a type of monitor suitable for displaying graphic images.

Computer 100 may also include a communication interface 120 coupled to bus 118. Communication interface 120 provides a two-way data communication coupling via a network link 121 to a local network 122. For example, if communication interface 120 is an integrated services digital network (ISDN) card or a modem, communication interface 120 provides a data communication connection to the corresponding type of telephone line, which comprises part of network link 121. If communication interface 120 is a local area network (LAN) card, communication interface 120 provides a data communication connection via network link 121 to a compatible LAN. Wireless links are also possible. In any such implementation, communication interface 120 sends and receives electrical, electromagnetic or optical signals which carry digital data streams representing various types of information.

Network link 121 typically provides data communication through one or more networks to other data devices. For example, network link 121 may provide a connection through local network 122 to host computer 123 or to data equipment operated by an Internet Service Provider (ISP) 124. ISP 124 in turn provides data communication services through the world wide packet data communication network now commonly referred to as the "Internet" 125. Local network 122 and Internet 125 both use electrical, electromagnetic or optical signals which carry digital data streams. The signals through the various networks and the signals on network link 121 and through communication interface 120, which carry the digital data to and from computer 100, are exemplary forms of carrier waves transporting the information.

Computer 100 can send messages and receive data, including program code, through the network(s), network link 121, and communication interface 120. In the Internet example, server 126 might transmit a requested code for an application program through Internet 125, ISP 124, local network 122 and communication interface 120. In accord with the invention, one such downloaded application is the using and accessing of information from fonts in multiple formats described herein.

The received code may be executed by CPU 113 as it is received, and/or stored in mass storage 112, or other non-volatile storage for later execution. In this manner, computer 100 may obtain application code in the form of a carrier wave.

The computer systems described above are for purposes of example only. An embodiment of the invention may be implemented in any type of computer system or programming or processing environment.

Structure and Interaction of Font Objects

Figure 5:
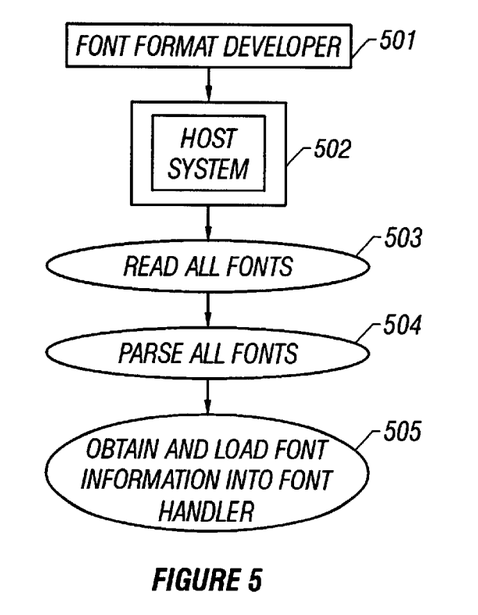
FIG. 5 is the method for creating and initializing Font Handler instances in one or more embodiments of the invention.

Once a font is created, formatting information is stored and the application developer needs a method of retrieving that information. Referring to FIG. 5, once a font developer 501 has developed various fonts in the desired format, the font files are stored on a host computer system 502. To provide the ability to access and utilize the multiple font formats created by the font developer 501, one or more embodiments of the invention provide for an internal abstract Font Handler class. An abstract class is a class that has an abstract function. An abstract function is merely declared and has no implementation defined in the class and as a result, no objects of such classes can ever be created. To use an abstract function, it must be defined in any subclass based on the abstract class. Thus, by declaring an abstract function, the developer is forced to define the function in any subclass created.

Figure 3:
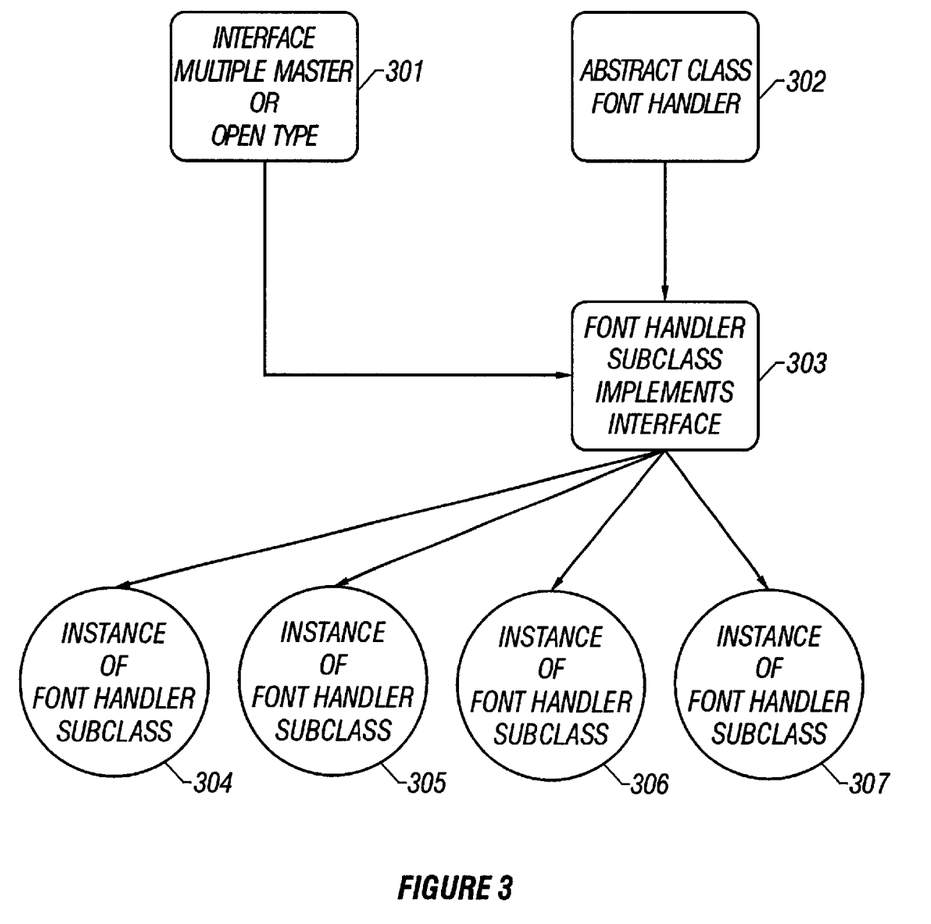
FIG. 3 describes the elements of a Font Handler subclass and the development of instances therefrom in one or more embodiments of the invention.

The Font Handler class is internal and may not be accessed by application developers that desire to use fonts. To access font information, one or more embodiments of the invention provide for a public Font class (accessible to application developers) that accesses and utilizes the Font Handler class (the relationship between the Font class and the Font Handler class and the implementation of the Font class is discussed below). As a result, a font format developer that desires application developers to utilize the developer's fonts must define a Font Handler subclass that implements the abstract methods (further details regarding specific examples of methods to be implemented are discussed below). Referring to FIG. 3, a font developer defines a subclass 303 based on the abstract Font Handler class 302. Multiple instances 304–307 of the Font Handler subclass may then be instantiated.

After defining the Font Handler subclasses 303, instances of the subclasses 304–307 (referred to as Font Handler instances) must be loaded with the font information from the host system. Referring again to FIG. 5, to load the information, all of the fonts in the Host System 502 are read at step 503. The information is then parsed at step 504. Finally, after obtaining the information, it is loaded into a Font Handler instance at step 505.

Font Interfaces

Referring to FIG. 3, while defining the Font Handler subclass 303, a font developer implements an interface 301 that provides for additional features which are specific to the appropriate font format. By implementing a font format interface 301, the resulting object will provide the developer accessibility to font format specific features previously unavailable. These font format specific features are provided in addition to the standard capabilities accessible through the abstract methods defines in the abstract Font Handler class.

For example, in one or more embodiments of the present invention, an OpenType interface is provided to the font developer that may be implemented by a particular Font Handler subclass. The OpenType interface represents fonts having either OpenType or TrueType formats. The goal for the interface is to be able to return font tables (sfnt tables) from the font. The sfnt tables contain formatting, metric, and other information for each glyph of a TrueType or OpenType font. In one or more embodiments of the invention, the OpenType interface may be comprised of one or more of the following two methods:

(1) public abstract int getVersion()
    Returns the version of the OpenType font. 1.0 is represented as 0x00010000.
(2) public abstract byte[] getFontTable(int sfntTag)
    Returns the table as an array of bytes for a given tag. Tags for sfnt tables include items like cmap, name and head. The byte array returned is a copy of the font data in memory.

By implementing this OpenType interface from a subclass of the Font Handler class, the font developer provides the ability for application developers to access the font table (using the getFontTable method) (containing font format specific information) for a font of either an OpenType or TrueType format (the interfaces are abstract and must therefore be defined by the font developer when they are implemented by a subclass). In addition, the application developer may access the version of the OpenType or TrueType font to determine whether font specific features are available (using the getVersion method).

In one or more embodiments of the present invention, a MultipleMaster interface may be implemented by a subclass of the Font Handler class. The MultipleMaster interface represents Type 1 Multiple Master fonts (PostScript fonts). In one or more embodiments of the invention, the Multiple-Master interface may be comprised of one or more of the following six methods, for example:

(1) public abstract int getNumDesignAxes()
    Returns the number of multiple master design controls. Design axes include things like width, weight and optical scaling.
(2) public abstract float[] getDesignAxisRanges()
    Returns an array of design limits interleaved in the form [from→to] for each axis. For example, design limits for weight could be from 0.1 to 1.0. The values will be returned in the same order returned by getDesignAxisNames().
(3) public abstract float[] getDesignAxisDefaults()
    Returns an array of default design values for each axis. For example, the default value for weight could be 1.6. The values will be returned in the same order returned by getDesignAxisNameso.
(4) public abstract String[] getDesignAxisNames()
    Returns the name for each design axis. This also determines the order in which the values for each axis will be returned.
(5) public abstract Font deriveMMFont(float axes[])
    Creates a new instance of a multiple master font based on the design axes values specified by the array. The size of the array must correspond to the value returned from getNumDesignAxes() and the values of the array elements must fall within limits specified by getDesignAxesLimits(). In case of an error, NULL is returned.
(6) public abstract Font deriveMMFont
    (float glyphwidths,
    float avgStemWidth,
    float typicalCapHeight,
    float typicalXHeight,
    float italicAngle)
    Creates a new instance of a multiple master font based on detailed metric information. In case of an error, NULL is returned. glyphwidths is an array of floats representing the desired width of each glyph in font space. avgStemWidth is the average stem width for the overall font in font space. typicalCapHeight is the height of a typical upper case character. typicalXHeight is the height of a typical lower case character. italicAngle is the angle at which the italics lean, in degrees counterclockwise from vertical.

The above six methods provide for the creation (using the deriveMMFont methods) and use of a multiple master type font and the retrieval of format specific information (using the getDesignAxisDefaults, getDesignAxisNames, getDesignAxisRanges, and getNumDesignAxes methods) from a PostScript font.

By implementing the font format specific interfaces, such as the MultipleMaster interface, the OpenType interface, or any other font format specific interfaces in the Font Handler subclass itself, only one object is needed to provide both the standard information required of all fonts in any format as well as the special information that is specific to the particular format of the font.

Referring to FIG. 3, to implement the interface 301, a font format developer merely needs to create a subclass 303 of the Font Handler class 302 that implements one of the interfaces and defines the relevant methods. The functions the font developer must define are provided by the abstract Font Handler class 302 and the Interface 301. For example, if the Font Handler class provides for two methods, getMetrics() and getFamilyName(), and the MultipleMaster interface provides for 1 method, getDesignAxisNames(), the font developer must define all three methods in the Font Handler subclass that implements the MultipleMaster interface. After defining the relevant methods, instances of the subclass may be created by developers.

Initialization of Fonts

Referring to FIGS. 3 and 5, a font developer creates a subclass 303 of Font Handler class 302 that implements one of the interfaces 301. At the time of initialization, the font information in the host system is read at step 503, the information is parsed at step 504, instances of the Font Handler subclass 304–307 are created, and the information is loaded into the instances at step 505. In addition, the information is cached into a list of fonts. Thus, for each font in the host system, an instance of a Font Handler subclass will be constructed and instantiated. A constructor is a function that returns a new instance of the specified class. For example, in one or more embodiments, a constructor for the Font Handler class may be:

public FontHandler(String fontFileToken, int fontFormat, int fontID); or public FontHandler(Inputstream in, int fontFormat, int fontID);

The parameters of the second constructor provide the ability for the developer to provide the FontHandler object with all of the necessary information regarding the font. For example, InputStream is the host system font information (in a stream form), fontFormat specifies the format (e.g., TrueType or Type 1), and fontID specifies the unique ID identifying a font face (e.g., Helvetica Bold). In this manner, a Font Handler object is created for each font in the host system.

Figure 4:
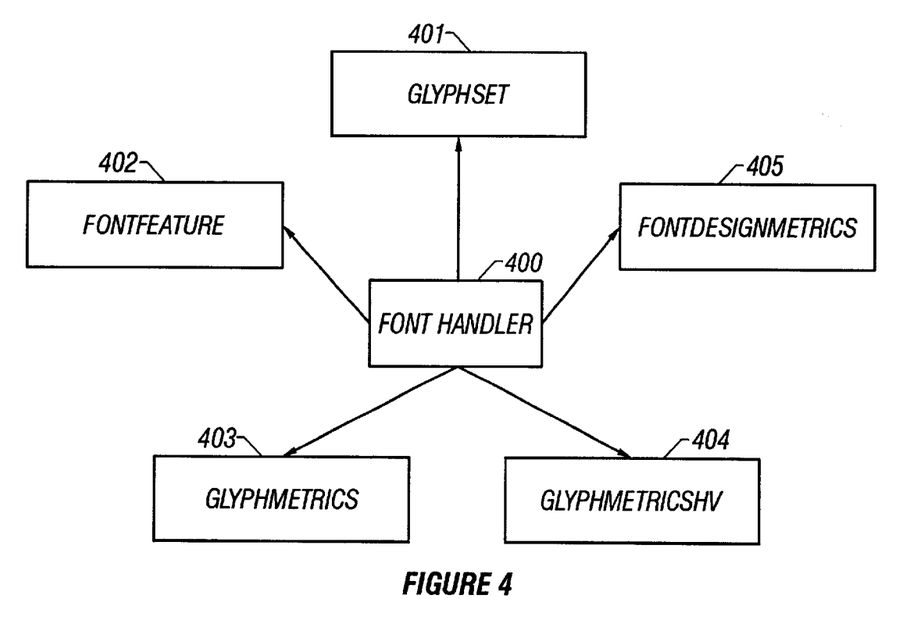
FIG. 4 describes the various objects that the Font Handler class may contain references to in one or more embodiments of the invention.

The Font Handler may or may not store the information provided directly in an instance of the Font Handler. Referring to FIG. 4, the Font Handler 400 may contain references to other font classes 401–405 where the information is stored. For example, Font Handler 400 may contain a reference to GlyphSet class 401 which is the lowest level representation used to draw text and contains exact glyph codes and positions. In addition, Font Handler 400 may contain references to FontFeature class 402, GlyphMetrics class 403, GlyphMetricsHV class 404, or FontDesignMetrics 405, for example. In one or more embodiments of the invention, the Font Handler class may contain methods for retrieving the information stored in variables or objects. For example, the Font Handler class may contain one or more of the following methods:

(1) public BezierPath createOutline(int numGlyphs, int[] glyphcodes, Point2D origin, float[] xOffset, float[] yOffset, AffineTransform trans, boolean hinted);

The createOutline method retrieves outlines for the given glyph codes and returns the outlines as a BezierPath.

(2) public Hashtable getDefaultEncoding()

The getDefaultEncoding method returns the encoding that the font has as a key value pair. The key is a unicode character code and the value is the glyph ID inside the font.

(3) public GlyphMetrics[] getMetrics(int numGlyphs, int[] glyphcodes, AffineTransform trans);

The getMetrics method retrieves the metrics for the given glyphs.

(4) public String getFontFullName();

The getFontFullName retrieves the font face name of the font (e.g., Helvetica Bold). (The different types of font names are discussed below).

(5) public String getPSName();

The getPSName method retrieves the postscript font face name of the font (e.g., Helvetica-Bold).

(6) public String getFamilyName()

The getFamilyName method retrieves the family name of the font (e.g., Helvetica).

(7) public int getGlyphIndex(char charcode);

The getGlyphIndex method retrieves the glyph code for the specified character code.

In addition to the above methods, the Font Handler may contain many additional methods in order to provide all relevant information.

Font Class

Figure 6:
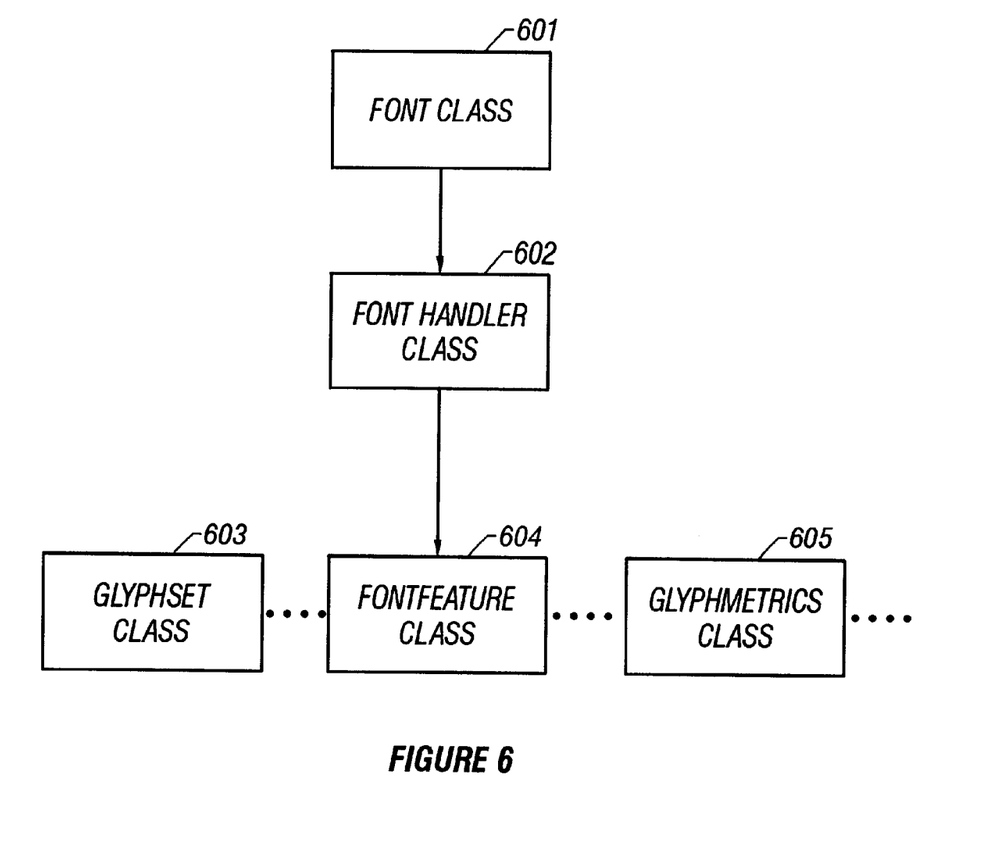
FIG. 6 shows the interaction between the Font class, Font Handler class and other classes in one or more embodiments of the invention.

The Font Handler class is private and not accessible to application developers. As a result, to provide access to the font information one or more embodiments of the present invention provide for a public Font class that accesses the Font Handler class. In one or more embodiments, the Font class contains a private reference to the Font Handler. Although the application developer cannot directly access a private variable or object, a public method (that a user may call) may access them. Consequently, the Font class may provide for public methods that accesses the Font Handler (and its variables and methods). Referring to FIG. 6, the Font class 601 contains a reference to the Font Handler class 602 (or a subclass of the Font Handler class). As discussed above, the Font Handler class 602 may contain references to numerous other objects 603–605.

There are three different names that may be retrieved from a Font object. The logical font, the font face name (referred to as font name), and the family name. The family name is the name of the font family that determines the typographic design across several faces, like Helvetica. The font name is the name of a particular font face (e.g., Helvetica Bold), and consists of the family name (e.g., Helvetica) and the style (e.g., Bold). The font face name is the one that should be used to specify fonts. The font face name signifies actual fonts in the host system, and does not identify a logical name that is merely mapped to the actual font in the host system.

A Font class instance represents an instance of a font face from a collection of font faces that are present in the system resources of the host system (the font faces present in the system resources are defined by font developers (e.g., Adobe) and loaded into the Font Handler). As examples, Helvetica Bold and Courier Bold Italic are font faces that are stored in the system resources or Font Handler instances. There can be several Font objects associated with a font face, each differing in size, style, transform and font features. In one embodiment, a getAllFonts() method returns an array of all font faces available in the system (merely returning the list of fonts that was cached at the time of initialization of the Font Handler). These font faces are returned as Font objects with a size of 1, identity transform and default font features. These base fonts can then be used to derive new Font objects with varying sizes, styles, transforms and font features via the deriveFont methods (discussed below) in the Font class.

Initialization of the Font Class

The Font class of one embodiment of the present invention provides for multiple methods (discussed below) and one or more public variables, for example, name, style, and size. Upon creation and initialization of each instance of the Font class, the variables are instantiated with data. The "name" variable will be instantiated with the specified name of the font. The "style" variable will be instantiated with the style of the font (either PLAIN, BOLD, ITALIC, or BOLD+ITALIC). The "size" variable will be instantiated with the point size of the font, rounded to the nearest integer.

Figure 2:
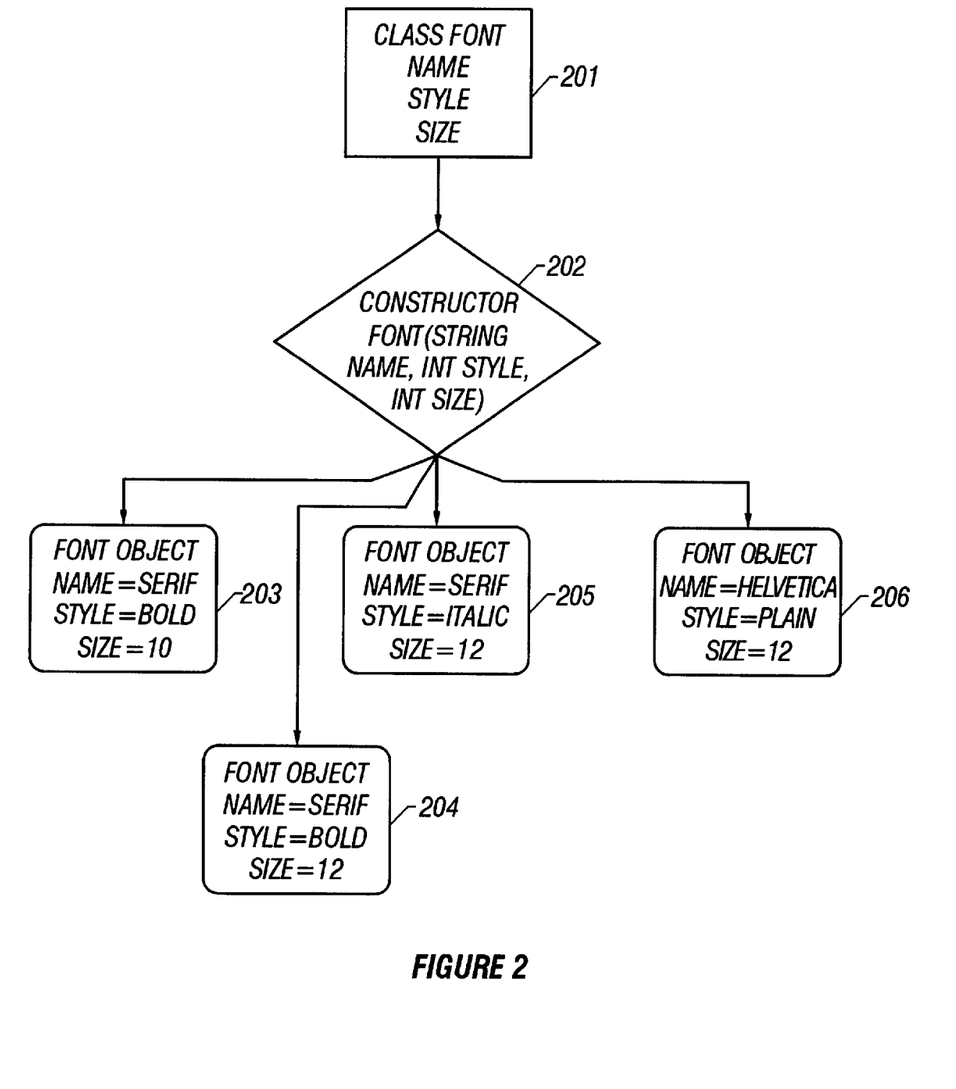
FIG. 2 demonstrates the construction of multiple instances of the Font class in one or more embodiments of the invention.

Referring to FIG. 2, the Font class 201 provides for a constructor 202 that creates a new font from the specified name, style, and point size. To create instances 203–206 of the Font class 201 and instantiate the objects 203–206 with appropriate data, the Font constructor method 202 is called while specifying the appropriate information as parameters (name, style, and size). The following constitutes the Font class constructor:

public Font(String name, int style, int size)

The above construct creates a new Font object from the specified name, style and point size. The "name" parameter is a string of characters that specifies the font name. The font name can be a logical font or a font face name. The "style" parameter is an integer and designates the style constant for the font. The "style" constant may be either PLAIN, BOLD, ITALIC, or BOLD+ITALIC. The "size" parameter is an integer and designates the point size of the font.

Figure 7:
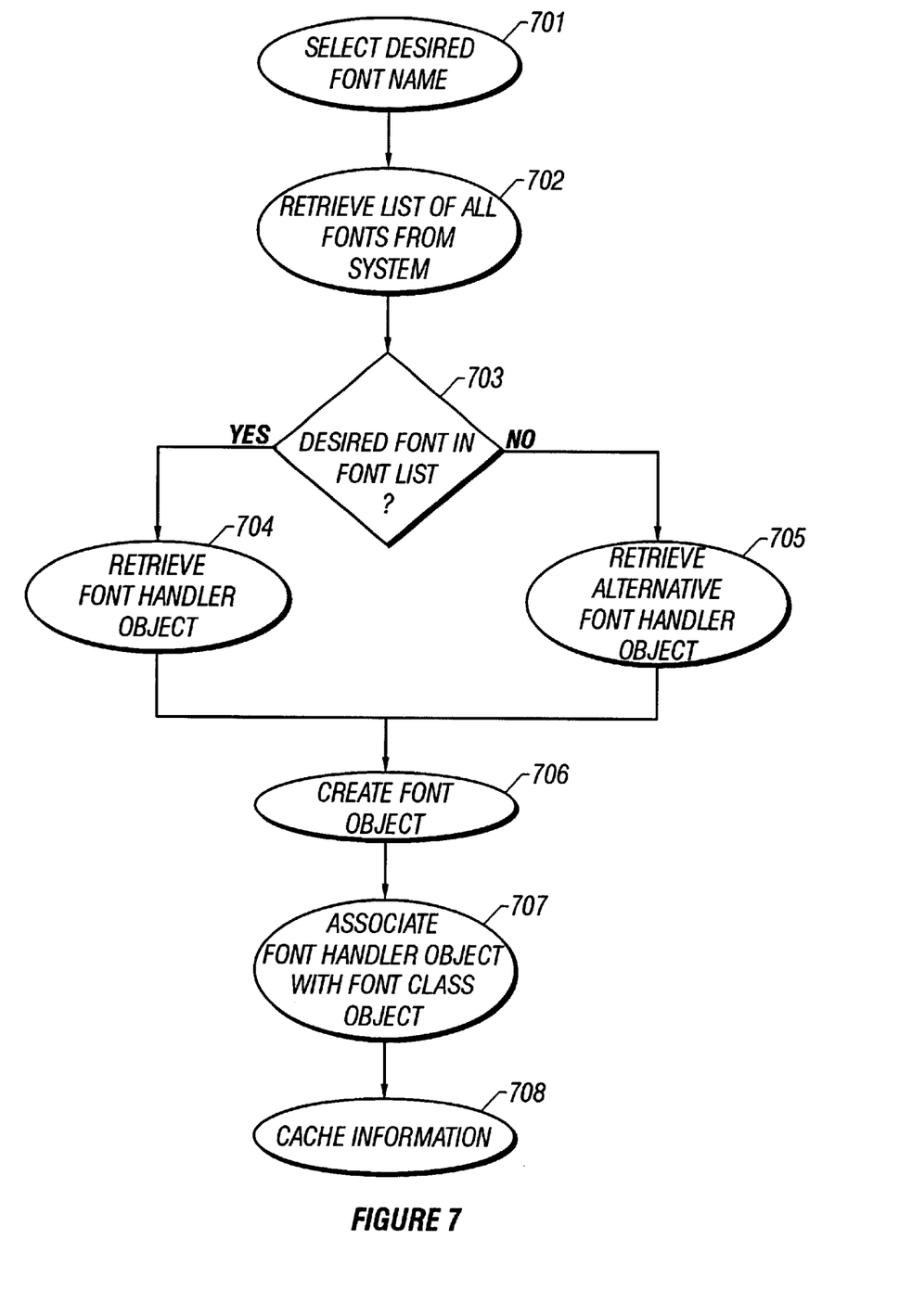
FIG. 7 is the method for creating and initializing a Font object in one or more embodiments of the invention.

FIG. 7 illustrates the steps of the constructor to initialize a Font class object. At step 701, the desired font name is selected by the application developer. To select the font name, the developer merely specifies the desired name as a parameter in the constructor call. The constructor retrieves a list of all fonts in the host system (as parsed into Font Handler objects) from the system at step 702. At step 703, it is determined if the name specified corresponds to an existing font (by comparing the specified name to the font list). If a font with the specified name exists, the appropriate Font Handler object is retrieved at step 704. If a font with the specified name does not exist, a Font Handler object that contains an alternative or equivalent font is retrieved at step 705. At step 706 an instance of a Font class object is created (this object may have been allocated earlier). The Font class instance is then instantiated with information. At step 707, the Font class instance is associated with the corresponding Font Handler object (by adding a reference or pointer to the corresponding Font Handler instance). The Font class contains several public references (variables or objects) that will be instantiated with data from the Font Handler in order to retrieve frequently used information without accessing the corresponding Font Handler every time. This instantiation of data at the time of initialization is referred to as caching. At step 708, frequently used information is cached into the Font class object. In one or more embodiments of the invention, one or more of the following Font class variables may be used to store frequently used data:

(1) protected String name
        The name of the font as passed to the constructor (e.g., Serif, Helvetica, Courier, etc.).
    (2) protected int style
        The style of the font, as passed to the constructor. This may be PLAIN, BOLD, ITALIC, or BOLD+ITALIC.
    (3) protected int size
        The point size of this font, rounded to the nearest integer.

FIG. 2 illustrates the structure and result of instantiating (or caching) several Font class objects that provide for the above three variables. The constructor sets the three variables of the object equal to the values as provided in its corresponding Font Handler instance. For example, to create a font called "Serif" that is Bold with a point size of 10, the developer makes the function call: new Font(Serif, BOLD, 10). If a corresponding Font Handler object is located, instantiated object 203 results. For every font that the application developer desires to use, a separate object is created. For example, if the developer desires to have two fonts that merely differ in their point size (e.g., 10 point v. 12 point), two separate instances of the Font class are created (e.g., object 203 and object 204). Similarly, if the developer desires to have two fonts that differ in their style (i.e., BOLD v. ITALIC), two separate instances of the Font class are created (e.g., object 204 and object 205). Likewise, if the developer desires to have a font with a different face or logical name (e.g., Helvetica in Object 206), an additional instance is created. In this manner, a font object is instantiated for each font that the developer desires to use.

In addition to the style and point size (as an integer), various additional Font class references may be used and cached with information. In one or more embodiments of the invention, such references may include family (a variable containing the family name of the font), pointSize (a variable containing the point size of the font in float), or fontDescriptor (a Font Descriptor object that contains additional properties for the font represented as key/value pairs). The invention is not limited to the above references and may contain more or less references than those discussed. These references may be public (and accessible to the application developer) or private (and only accessible to the application developer through public methods within the Font class). If the reference is private, to obtain the information stored within the reference, a method of the Font class is used. For example, if the Family variable is private, the developer may have to utilize a getFamily() method to retrieve the information. In this manner, access to important font information is limited to the font developer (an end user or application developer does not have authorization to alter or directly retrieve private information).

When a Font class object is created, the corresponding Font Handler represents a certain type of formatted font (e.g., TrueType or Type 1) and this implements a format specific interface (e.g., MultipleMaster interface or Open-Type interface). As a result, the Font class object maintains a reference to the Font Handler that internally maintains the type of format. Consequently, the application developer may access font format specific information using public methods that access the Font Handler.

Numerous publicly accessible methods defined in the Font class provide simple retrieval of the information contained in the private Font class references and Font Handler objects. Further, although the above private variables and objects are not accessible to a developer, the publicly accessible methods provide the means to retrieve the information retained in the variable or object. The methods that do not retrieve the information from the Font class variables and objects may retrieve the information using the reference to the Font Handler class. In one or more embodiments of the invention, the following methods are defined in the Font class:

(1) public Transform getTransform()
        Returns the transform associated with this font. This method may obtain the transform (that may be defined by the user) from cache.
    (2) public String getFamily()
        Returns the family name of the font (for example, Helvetica). Use getName() to get the logical name of the font. Use getFontName() to get the font face name of the font. This method may access an equivalent method in the Font Handler (e.g., a method called getFamilyName()).

(3) public String getName()
Returns the logical name of the font. Use getFamily() to get the family name of the font. Use getFontName() to get the font face name of the font. This method may obtain the logical name from cache.

(4) public String getFontName()
Returns the font face name of the font (for example, Helvetica Bold). Use getFamily() to get the family name of the font. Use getName() to get the logical name of the font. This method may obtain the font face name from cache.

(5) public int getStyle()
Returns the style of the font. This may be PLAIN, BOLD, ITALIC, or BOLD+ITALIC. This method may obtain the style from cache.

(6) public int getSize()
Returns the point size of the font, rounded to integer. Most users are familiar with the idea of using point size to specify the size of glyphs in a font. This point size defines a measurement between the baseline of one line to the baseline of the following line in a single spaced text document. The point size is based on typographic points, approximately $1/72$ of an inch. This method may obtain the point size (that may be defined by the user) from cache.

(7) public float getSize2D()
Returns the point size of the font in float. This method may obtain the point size (that may be defined by the user) from cache.

(8) public boolean is plain()
Returns true if the font is plain.

(9) public boolean isBold()
Returns true if the font is bold.

(10) public boolean isItalic()
Returns true if the font is italic.

(11) public int hashCode()
Returns a hashcode for this font.

(12) public boolean equals(Object obj)
Compares this object to the specified object.

(13) public String toString()
Converts this object to a String representation.

(14) public int getNumGlyphs()
Returns number of glyphs in the font. Glyph codes for the font will range from 0 to getNumGlyphs() −1. This method may obtain the number of glyphs from cache.

(15) public GlyphMetrics getGlyphMetrics(int glyphcode)
Returns the metrics information for a glyph specified by a glyph code. This method may access an equivalent method in the Font Handler (e.g., a method called getMetrics()).

(16) public FontDesignMetrics getDesignMetrics()
Returns the font design metrics information for this font.
This method may access an equivalent method in the Font Handler (e.g., a method called getMetrics()).

(17) public Shape getGlyphoutline(int glyphcode)
Returns the outline description of a glyph specified by a glyph code. This method may access an equivalent method in the Font Handler (e.g., a method called createOutline()).

(18) public FontFeature[] getFeatures()
Returns an array of font features available in this font. Feature include things like ligatures and glyph substitution. This method may access an equivalent method in a Font Handler that implements a font format interface.

(19) public Font deriveFont(int style, float size, FontFeature features[])
Creates and returns a new Font object by replicating the current Font object with the new style, size and font features associated with it.

(20) public Font deriveFont(int style, AffineTransform trans, FontFeature features[])
Creates and returns a new Font object by replicating the current Font object wit a new style, transform and font features associated with it.

(21) public Font deriveFont(float size)
Creates and returns a new Font object by replicating the current Font object with a new size associated with it.

(22) public Font deriveFont(AffineTransform trans)
Creates and returns a new Font object by replicating the current Font object with a new transform associated with it.

(23) public Font deriveFont(int style)
Creates and returns a new Font object by replicating the current Font object with a new style associated with it.

(24) public Font deriveFont(FontFeature features[])
Creates and returns a new Font object by replicating the current Font object with a new set of font features associated with it.

(25) public GlyphSet getGlyphSet(char charArray[], int offset, int count)
Converts characters in the charArray to font glyph codes and returns a GlyphSet containing a collection of glyphs and glyph positions. Glyph substitution may be performed. This method may access an equivalent method in the Font Handler.

(26) public GlyphSet getGlyphSet(String str)
Converts all characters in the String Object to font glyph codes and returns a GlyphSet object containing a collection of glyphs and glyph positions. Glyph substitution may be performed. This method may access an equivalent method in the Font Handler.

(27) public int can Display(String str)
Indicates whether a string is displayable by this Font. For strings with Unicode encoding, it is important to know if a given Font can display the string. This method returns an offset into the String str which is the first character the Font cannot display. If the Font can display all characters, −1 is returned. This method may access an equivalent method in the Font Handler.

One or more embodiments of the invention may define and include one or more of the above methods. As demonstrated above, many of the above Font class methods access and utilize methods from the Font Handler that are defined by a font developer. The combination of the Font class with the Font Handler class and the interfaces provide the ability to store general information regarding the font in one object. In addition, font format specific information is also stored in the object and may be used in application that require such information.

Incorporating the Font Handler Class in the Font Class

In one or more embodiments, the Font class incorporates all of the methods and references of the Font Handler class (referred to as an Incorporating embodiment). This incorporation provides the Font class with the ability to access and utilize font information without using the Font Handler class.

Referring to FIG. 2, in an Incorporating embodiment, additional variables or methods stored in each instance 203–206 of the font class 201 provide the developer with access to a variety of font information. Referring to FIG. 4, the references to other font classes contained in the Font Handler 401–405 are incorporated into the Font class providing the ability to access font information through the references from the Font class itself (without using the Font Handler).

In an Incorporating embodiment, the Font class is initialized as the Font Handler class is initialized, thus obtaining the relevant font information from the system itself. Referring to FIG. 5, the initialization steps for the Font Handler (steps 501–505) are similar. However, instead of obtaining and loading font information into the Font Handler at 505, the information is obtained and loaded into instances of the Font class. Referring to FIG. 6, the references 603–605 contained within the Font Handler object are incorporated and used in the Font class directly.

An Incorporating Font class may implement the Multiple-Master or OpenType interfaces and provide the relevant font format specific information directly to the application developer. Thus, referring to FIG. 3, instead of having an Abstract Class Font Handler 302, the Incorporating embodiment has an Abstract Class Font. Incorporating Subclasses 303 of the Incorporating Font class 302 may implement a format specific interface 301. Instances 304–307 of the Incorporating Font Subclass 303 are then created for each font in the system. Such an embodiment provides flexibility and a wide range of font information that is directly accessible to an application developer.

Referring to FIG. 7, using an Incorporating embodiment, when an application developer desires to use a specific font, the developer selects the desired font name at step 701. At step 702, the list of all fonts from the system are obtained. At step 703, it is determined if the desired font is in the font list. However, the Incorporating embodiment differs from the Font Handler embodiment at steps 704–708. In the incorporating embodiment, if the font is in the font list, then the Incorporating Font class object containing that font is retrieved at step 704. If the font is not in the font list, then an alternative Incorporating Font class object (that may contain the most similar font) is retrieved at step 705. In an Incorporating embodiment, steps 706–708 are not performed because the relevant information is stored directly in instances of the Incorporating Font class and there is no need to associate a Font Handler or to cache information. In this manner, an Incorporating Font class provides the ability for an application developer to access and use a font that is present in the system.

Thus, a method and apparatus for providing use and access to information (including font format specific information) from fonts of various formats has been described in conjunction with one or more specific embodiments. One or more embodiment of the invention are described above. However, the invention is not limited to the above description and is defined by the claims and their full scope of equivalents.

We claim:

1. A method for providing the developer of a software application with access to information about fonts, said method comprising the steps of:

a computer program written by a software developer, said computer program obtaining at least one font handler object, said at least one font handler object implementing a font format interface, said font format interface providing at least one common method to access a subset of font format specific features of a set of font format specific features, said computer program configured to access said set of font format specific features without specifying a font type;

obtaining a font object comprised of at least one reference to said set of font specific features;

associating said font object with said font handler object;

receiving a message requesting access to said subset of said font format specific features from said font object;

retrieving said subset of said set of font format specific features, wherein said retrieving step further comprises the steps of:
  invoking said at least one common method to access said subset of said font format specific features from said at least one font handler object; and
  obtaining said subset of said font parameters using said reference.

2. The method of claim 1, wherein said font format interface is an interface for TrueType fonts.

3. The method of claim 1, wherein said font format interface is an interface for PostScript fonts.

4. The method of claim 1, wherein said associating step further comprises loading said font object with initial information from said at least one font handler object.

5. The method of claim 1, wherein said subset of font format specific features font information is retrieved from at least one variable in said font object.

6. The method of claim 1, wherein said retrieving said subset of format specific features step further comprises the steps of:
  invoking said at least one common method through said association in said font object;
  providing said set of font format specific features to said font object.

7. The method of claim 1, wherein said step further comprises the steps of:
  reading host font format specific features from a disk file;
  parsing said host font format specific features;
  obtaining a font handler instance; and
  loading said parsed font format specific features into said font handler instance.

8. The method of claim 1, wherein said step of obtaining a font object comprises the steps of:
  selecting a desired font name;
  retrieving said at least one font handler object using said desired font name; and
  instantiating a font object with font format specific features from said retrieved font handler object.

9. The method of claim 1, wherein said at least one font handler object implements an abstract font handler interface that defines standard font format specific features common to all font formats.

10. The method of claim 1, wherein said at least one common method comprises retrieving a subset of font format specific features from an instance of a second object containing said font format specific features.

11. The method of claim 1, further comprising the steps of:
  selecting a font name;
  retrieving a list of all fonts from said computer system;

determining if said selected font name is in said font list; and retrieving an instance of said font object.

12. The method of claim 11 wherein said retrieved instance of said font object contains a font represented by said selected font name.

13. The method of claim 11 wherein said retrieved instance of said font object contains a font having a subset of font format specific features similar to that of a font represented by said selected font name.

14. A computer system comprising:

a processor;

a memory coupled to said processor;

a computer program written by a developer, said computer program comprising a font format interface configured to provide at least one common method to obtain a subset of a font format specific features within said memory;

at least one font handler object configured to implement said font format interface within said memory;

a font object comprised of at least one reference to said font format specific features;

object code executed by said processor, said object code configured to execute at least one of the following:
  a method to associate said font object with said font handler object;
  a method to request said subset of said font format specific features in said font object;
  a method to invoke one said at least one common method to access said subset of said font format specific features; and
  a method to obtain said subset of said font format specific features using said reference.

15. The computer system of claim 14, wherein said font format interface is an interface for TrueType fonts.

16. The computer system of claim 14, wherein said format interface is an interface for PostScript fonts.

17. The computer system of claim 14, wherein said common method to associate further comprises object code configured to load said font object with initial font information from said font handler object.

18. The computer system of claim 14, wherein said subset of font format specific features is retrieved from at least one variable in said font object.

19. The computer system of claim 14, wherein said at least one common method to retrieve further comprises:

executable code configured to cause said processor to invoke said at least one common method through said association in said font object;

executable code configured to cause said processor to provide said subset of font format specific features to said font object.

20. The computer system of claim 14, wherein is obtained by:

executable code configured to cause said processor to read host font format specific features from a disk file;

executable code configured to cause said processor to parse said host font format specific features;

executable code configured to cause said processor to obtain an instance of said font handler; and executable code configured to cause said processor to load said parsed font format specific features into said font handler instance.

21. The computer system of claim 14, wherein said font object is obtained by:

executable code configured to cause said processor to retrieve said at least one font handler object when provided with a desired font name; and executable code configured to cause said processor to instantiate a font object with font information from said retrieved at least one font handler object.

22. The computer system of claim 14, further comprising:

an abstract font handler interface configured to provide at least one common method to obtain standard font format specific features common to all font formats; and wherein said at least one font handler object implements said abstract font handler interface.

23. The computer system of claim 14, wherein said object code executed by said processor to invoke at least one common method comprises object code executed by said processor to retrieve a subset of font format specific features from an instance of a second object containing said font format specific features.

24. The computer system of claim 14, further comprising: object code executed by said processor to select a font name;

object code executed by said processor to retrieve a list of all fonts from said memory;

object code executed by said processor to determine if said selected font name is in said font list; and object code executed by said processor to retrieve an instance of said font object.

25. The computer system of claim 24 wherein said retrieved instance of said font object contains a font represented by said selected font name.

26. The computer system of claim 24 Wherein said retrieved instance of said font object contains a font having a subset of font format specific features similar to that of a font represented by said selected font name.

27. An article of manufacture comprising:

a computer usable medium having computer readable program code embodied therein configured to provide the developer of a software application access to information about fonts, the computer readable program code in said article of manufacture comprising:

computer readable program code configured to cause a computer to obtain at least one font handler object, said at least one font handler object implementing a font format interface, said font format interface providing at least one common method to access a subset of a font format specific features, said computer program configured to access said font format specific features without specifying a font type;

computer readable program code configured to cause said computer to obtain a font object comprised of at least one reference to said font format specific features;

computer readable program code configured to cause said computer to associate said font object with said at least one font handler object;

computer readable program code configured to cause said computer to receive a message requesting access to said subset of said font format specific features from said font object;

computer readable program code configured to cause said computer to retrieve said subset of said font format specific features, wherein said to retrieve said subset of said font format specific features further comprises:

invoking one of said at least one common method to access said subset of said font format specific features from said at least one font handler object; and obtaining said subset of said font format specific features using said reference.

28. The article of manufacture of claim 27 wherein said font format interface is an interface for TrueType fonts.

29. The article of manufacture of claim 27 wherein said font format interface is an interface for PostScript fonts.

30. The article of manufacture of claim 27 wherein program code configured to cause said computer to associate further comprises computer readable program code configured to cause said computer to load said font object with font format specific features from said font handler object.

31. The article of manufacture of claim 27 wherein said font format specific features is retrieved from at least one variable in said font object.

32. The article of manufacture of claim 27 wherein program code configured to cause said computer to retrieve a subset of font format specific features further comprises:
   computer readable program code configured to cause said computer to invoke said common method through said association in said font object;
   computer readable program code configured to cause said computer to provide said font format specific features to said font object.

33. The article of manufacture of claim 27 wherein program code further comprises:
   computer readable program code configured to cause said computer to read host font format specific features in said from a disk;
   computer readable program code configured to cause said computer to parse said host font information;
   computer readable program code configured to cause said computer to obtain a font handler instance; and
   computer readable program code configured to cause said computer to load said parsed font format specific features into said font handler instance.

34. The article of manufacture of claim 27 wherein program code configured to cause said computer to obtain a font object further comprises:
   computer readable program code configured to cause said computer to select retrieve said at least one font handler object when provided a desired font name; and
   computer readable program code configured to cause said computer to instantiate a font object with font format specific features from said retrieved font handler object.

35. The article of manufacture of claim 27 wherein said at least one font handler object implements an abstract font handler interface, said abstract font handler interface comprising computer readable program code configured to cause a computer to obtain standard font format specific features common to all font formats.

36. The article of manufacture of claim 27 wherein said program code configured to cause said computer to invoke at least one common method comprises computer readable program code configured to cause said computer to retrieve a subset of font format specific features from an instance of a second object containing said font format specific features.

37. The article of manufacture of claim 27 further comprising:
   computer readable program code configured to cause said computer to select a font name;
   computer readable program code configured to cause said computer to retrieve a list of all fonts from said computer system;
   computer readable program code configured to cause said computer to determine if said selected font name is in said font list; and
   computer readable program code configured to cause said computer to retrieve an instance of said font object.

38. The article of manufacture of claim 37 wherein said retrieved instance of said font object contains a font represented by said selected font name.

39. The article of manufacture of claim 37 wherein said retrieved instance of said font object contains a font having a subset of font format specific features associated with a font represented by said selected font name.

40. A computer data signal embodied in a carrier wave transmitted across a physical medium, said carrier wave representing sequences of instructions which, when executed by a processor, cause said processor to provide the developer of a software application with access to information about fonts by performing the steps of:
   obtaining at least one font handler object by a computer program written by a software developer, said at least one font handler object implementing a font format interface, said font format interface providing at least one common method to access a subset of font format specific features, said computer program capable of accessing said font format specific features without specifying a font type;
   obtaining a font object comprised of at least one reference to said font format specific features;
   associating said font object with said at least one font handler object;
   receiving a message requesting access to said subset of said font format specific features from said font object;
   retrieving said subset of said font format specific features, wherein said retrieving step further comprises the steps of:
      invoking one of said at least one common method to access subset of said font format specific features from said at least one font handler object; and
      obtaining said subset of font format specific features using said reference.

41. The computer data signal of claim 40, wherein said font format interface is an interface for TrueType fonts.

42. The computer data signal of claim 40, wherein said font format interface is an interface for PostScript fonts.

43. The computer data signal of claim 40, wherein said associating step further comprises loading said font object with initial information from said font handler object.

44. The computer data signal of claim 40, wherein said subset of font format specific features is retrieved from at least one variable in said font object.

45. The computer data signal of claim 40, wherein said retrieving said subset of font format specific features step further comprises the steps of:
   invoking said at least one common method through said association in said font object;
   providing said subset of font format specific features to said font object.

46. The computer data signal of claim 40, wherein said step further comprises the steps of:
   reading host font format specific features from a disk file;
   parsing said host font format specific features;
   obtaining a font handler instance; and
   loading said parsed font format specific features into said font handler instance.

47. The computer data signal of claim 40, wherein said step of obtaining a font object comprises the steps of:
   selecting a desired font name;
   retrieving said at least one font handler object using said desired font name; and instantiating a font object with font format specific features from said retrieved font handler object.

48. The computer data signal of claim 40, wherein said at least one font handler object implements an abstract font handler interface that defines standard font format specific features common to all font formats.

49. The computer data signal of claim 40, wherein said at least one common method comprises retrieving a subset of font format specific features from an instance of a second object containing said font format specific features.

50. The computer data signal of claim 40 further comprising the steps of:

selecting a font name;

retrieving a list of all fonts from said computer system;

determining if said selected font name is in said font list; and retrieving an instance of said font object.

51. The computer data signal of claim 50, wherein said retrieved instance of said font object contains a font represented by said selected font name.

52. The computer data signal of claim 50, wherein said retrieved instance of said font object contains a font having a subset of font format specific features similar to that of a font represented by said selected font name.

53. A method for providing the developer of a software application with access to information about fonts, said method comprising the steps of:

obtaining at least one font handler object by a computer program written by a software developer, said at least one font handler object implementing a font format interface, said font format interface providing at least one common method to access a subset of font format specific features, said computer program capable of accessing said font format specific features without specifying a font type;

said at least one font handler object implementing an abstract font handler interface that defines standard font information common to all font formats;

obtaining a font object comprised of at least one reference to said font format specific features;

associating said font object with said font handler object;

receiving a message requesting access to said subset of said font format specific features from said font object;

retrieving said subset of said font format specific features, wherein said retrieving further comprises the steps of:

invoking one of said at least one common method to access a subset of font format specific features from said at least one font handler object through said association in said font object;

obtaining said subset of font format specific features from at least one of said font handler references;

providing said font format specific features to said font object.

\* \* \* \* \*